United States Patent [19]

Schultz et al.

[11] Patent Number: 5,095,610
[45] Date of Patent: Mar. 17, 1992

[54] METHOD FOR MANUFACTURING AND WINDING STATOR CORE STACKS FOR ELECTRIC MOTORS WITH INTERNAL ROTORS

[75] Inventors: Ulrich Schultz; Willi Brosche, both of Nuremberg, Fed. Rep. of Germany

[73] Assignee: Gebruder Buhler Nachfolger GmbH, Nuremberg, Fed. Rep. of Germany

[21] Appl. No.: 574,450

[22] Filed: Aug. 29, 1990

[30] Foreign Application Priority Data

Sep. 4, 1989 [DE] Fed. Rep. of Germany ....... 3929331

[51] Int. Cl.$^5$ ............................................. H02K 15/02
[52] U.S. Cl. ........................................ 29/596; 29/606; 29/609
[58] Field of Search ................. 29/596, 598, 609, 605, 29/606, 732; 310/42

[56] References Cited

U.S. PATENT DOCUMENTS

| | | | |
|---|---|---|---|
| 2,354,551 | 7/1944 | Sawyer | 29/596 |
| 2,607,816 | 8/1952 | Ryder et al. | 29/596 |
| 4,438,558 | 3/1984 | Mitsui | 29/596 X |

FOREIGN PATENT DOCUMENTS

| | | |
|---|---|---|
| 891882 | 1/1953 | Fed. Rep. of Germany. |
| 1763288 | 4/1968 | Fed. Rep. of Germany. |
| 2461695 | 7/1975 | Fed. Rep. of Germany. |
| 2915290 | 10/1980 | Fed. Rep. of Germany. |
| 8435837 | 4/1986 | Fed. Rep. of Germany. |
| 88593 | 3/1972 | German Democratic Rep.. |

Primary Examiner—Carl E. Hall
Attorney, Agent, or Firm—Mason, Fenwick & Lawrence

[57] ABSTRACT

A method of manufacturing and winding stator core stacks intended for electric motors with internal rotors. Identical sectors are punched and stacked from a sheet metal strip and have spaced pole shoe elements extending radially from a flux return element or core with their free ends projecting inward. The pole shoe elements are given a winding. During the punching process, the pole shoe elements and the flux return element or core are separated from one another and stacked individually, the pole shoe elements being held by an inner ring also punched from the sheet metal strip. Thereafter, windings are applied and finally the wound pole shoes are assembled with the return element to form the stator.

The process is especially suitable for manufacturing stators for low-power and miniature motors (less than 1 kW).

4 Claims, 3 Drawing Sheets

METHOD FOR MANUFACTURING AND WINDING STATOR CORE STACKS FOR ELECTRIC MOTORS WITH INTERNAL ROTORS

The invention relates to a method of manufacturing and winding stator core stacks intended for use electric motors having internal rotors. In general, in known methods identical segments are punched from a sheet metal strip and the poles, extending radially inward from outwardly disposed return elements, are stacked and provided with a winding in such manner that first the segment areas forming the poles and return elements are separated from one another and stacked individually. Then the poles are positively held in position by means of a central holder which grasps the pole shoes and they are then wound from outside, and finally the wound poles with the return elements are assembled to the stators, at which point the central holder is removed.

A method of this kind is known from German OS 29 15 290. The important disadvantage of this known method lies in the fact that a separately manufactured clamping device must be provided to hold the poles after they are separated from the segment area forming the return element, said clamping device holding the poles immovably during the winding process. This auxiliary device, which is quite complex in construction and consists of a number of individual parts, entails additional costs; in addition, an additional work step is required to introduce it into the star-shaped pole stack arrangement. Finally, the accuracy of the fit of such a separately manufactured auxiliary device leaves something to be desired.

The object of the invention is to avoid using an auxiliary device applied externally in a separate work step, for the positive locking of the punched pole stacks, and to ensure the greatest possible accuracy of fit in immobilizing them. This object is achieved according to the invention by virtue of the fact that an inner ring which forms the central holder is punched out, and then stacked with the pole stacked to hold the pole shoes, and is later separated and becomes scrap from the punching operation.

On the basis of this method, the central holder which serves as a clamping device is produced at the same time in the punching and stacking process; it is created with practically no additional consumption of time, material, or money. Its fit is optimal; during the winding process it ensures precise maintenance of the radially directed position of the poles, which therefore do not change their position as a result of the mechanical stresses that develop during winding, and this has a very favorable effect on the wound pole spider when the feedback element is mounted. After the wound pole spider is assembled with the feedback element, it is merely necessary to push out the inner ring.

In another especially advantageous embodiment of the invention, the inner circumference of the inner ring forms the central holder for the mandrel of the winding machine, with grooves advantageously being punched out radially within the areas of the inner rings that hold the pole shoes, said grooves opening toward the pole shoes. The latter measure reduces the contact area between the inner ring and the inner pole shoes, making it easier to push the inner ring out.

According to another important feature of the invention, a positive interengagement between the inner ring and the pole shoes is provided, having the form of a swallowtail. This type of positive interengagement is very easy to make by punching and poses no difficulties whatever as far as pushing out the inner ring to separate it is concerned.

The drawing shows an example of the invention.

Figure 1A:
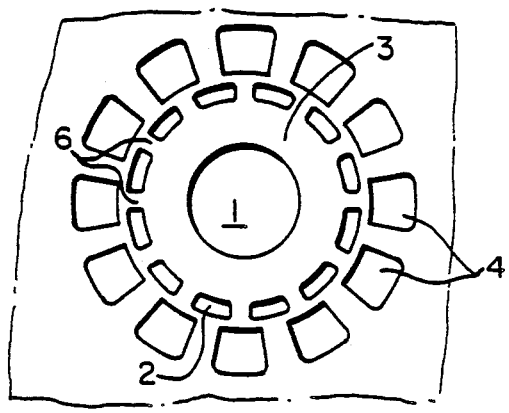
FIG. 1A shows a metal strip after a first punching step.
Figure 1B:
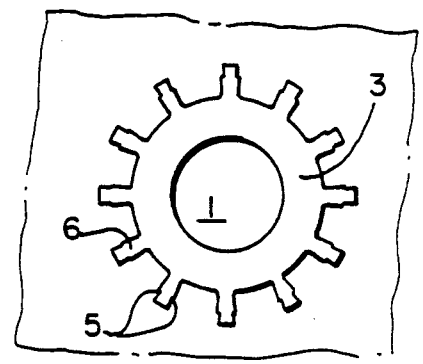
FIG. 1B shows the metal strip after a second punching step, showing an inner ring formed after the second punching step.
Figure 1C:
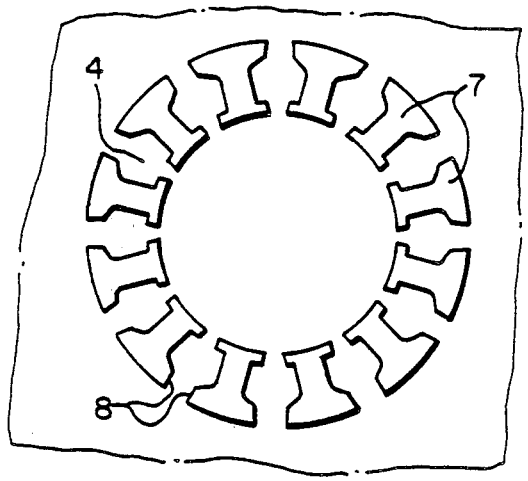
FIG. 1C shows the metal strip after a third punching step, showing pole shoes formed by the third punching step.
Figure 1D:
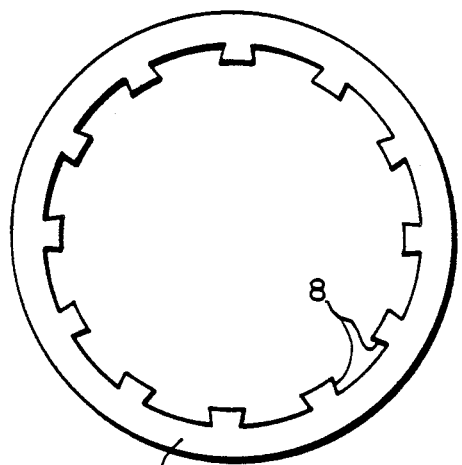
FIG. 1D shows a flux return element formed after a fourth punching step.

FIGS. 1A–1D show the four punching steps that occur in the course of the process according to the invention. In the first punching step, FIG. 1A a central opening 1 for the mandrel of the winding machine is punched out together with grooves 2 in the outer circumference of an inner ring 3, and spaces 4 to receive the winding. In the second punching step, swallowtail-shaped undercuts 5 are formed in the areas below spaces 4 and above pole-forming elements 7 between grooves 2. FIG. 1C shows the result of the third punching step wherein spaced, radially directed pole elements 7 with outer and inner pole shoes are cut free, with the punching line following a certain arc through the outer surfaces of outer shoes of pole elements 7 with undercuts 8 enlarging spaces 4. In the fourth punching step FIG. 1D, flux return element or core 9 is cut free by an outer circular cut.

In the first punching step, the punched parts drop out as scrap. The second punching step separates inner pole shoes from inner ring 3, while forming a positive interengagement between inner ring 3 and inner pole shoes by undercuts 5. The third punching step results in the complete cutting free of the poles, once again with formation of a positive interengagement between the outer pole shoes and their surrounding areas by undercuts 8. Before the fourth punching step is carried out, inner ring 3, which positively holds the inner pole shoes, is lowered and stacked with the pole elements 7 held in this manner. The flux return element 9 produced in the fourth punching step is stacked separately after being indexed, i.e., being marked with respect to its position relative to the component composed of pole elements 7 with pole shoes plus inner ring 3.

Figure 2:
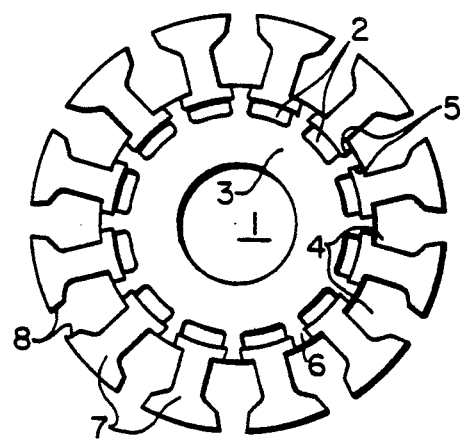
FIG. 2 is a front elevation of the pole spider held by the inner ring.
Figure 3:
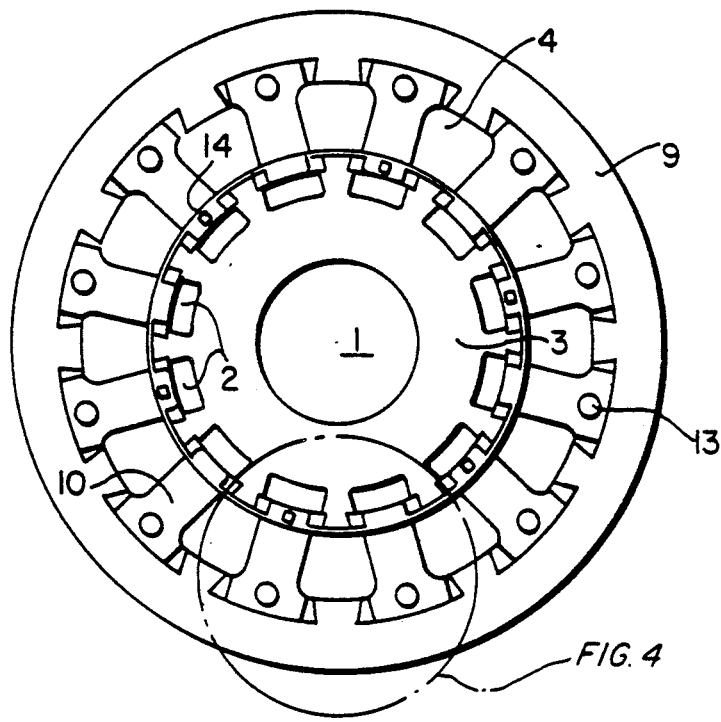
FIG. 3 is a front elevation of the stator, with the winding not shown, before the inner ring is pushed out.

FIG. 2 shows the stage of the process following the third punching step: inner pole shoes are positively held on inner ring 3 against rotational movement by swallowtail-shaped interengagement 5 which permits pushing out the inner ring. It is merely necessary at this point, see FIGS. 3 and 4 to insulate spaces 4, apply a cover 10 to the end of the pole spider, apply the external windings to the pole elements, add groove slides 11, and slide on flux return element 9.

Figure 4:
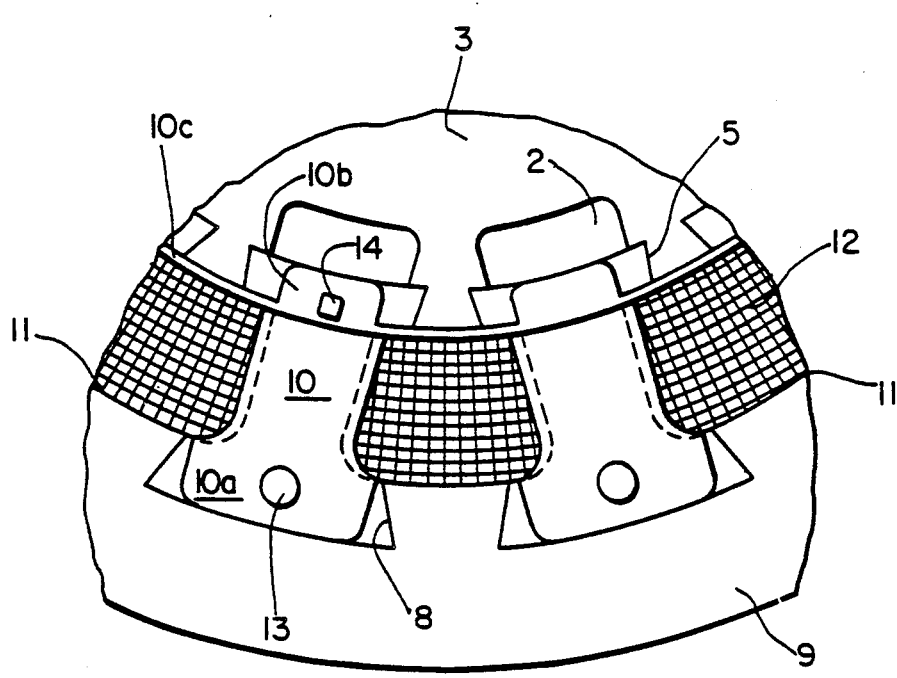
FIG. 4 shows Section x in FIG. 3 enlarged, with the winding cut away.

FIG. 4 shows a winding 12 in each of the spaces 4 and shows cover 10, which is composed of a radially directed outer T-shaped part 10a, an inner axially projecting basic part 10b, and an annular limiting flange 10c which connects the individual covering areas. The cross member of T-shaped part 10a leaves free the areas adjacent to undercut 8, so that the module composed of the inner ring, poles, and windings can be secured by caulking, gluing, or laser welding and the flux return element 9 can be secured against relative movements in the axial direction; in addition, the free area of outer pole shoes adjacent to undercut 8 can serve as a support surface when flux return element 9 is mounted. The foot of T-shaped part 10a is slightly wider than the pole which it covers in order to keep winding 12 away from its sharp-edged marginal areas; since the insulation on cover 10 is softer as a rule than the material of which the poles are made, winding 12 is protected by cover 10. At its outer end, T-shaped part 10a is provided with an external limiting pin 13, which prevents winding 12 from projecting too far radially outward. On the opposite side, axially projecting basic part 10b keeps winding 12 from sliding off the poles inward; 14 holders 14 are provided for the ends of the windings. The limiting flange 10c serves both to connect between the individual covering areas and also completes the internal support for winding 12 formed by the projection of basic part 10b. The areas of the inner pole shoe left free by basic part 10b around undercut 5 serve as support surfaces when knocking out the inner ring 3, which can be accomplished with relatively little force because of the short contact zones between inner ring 3 and the inner pole shoes.

Figure 5:
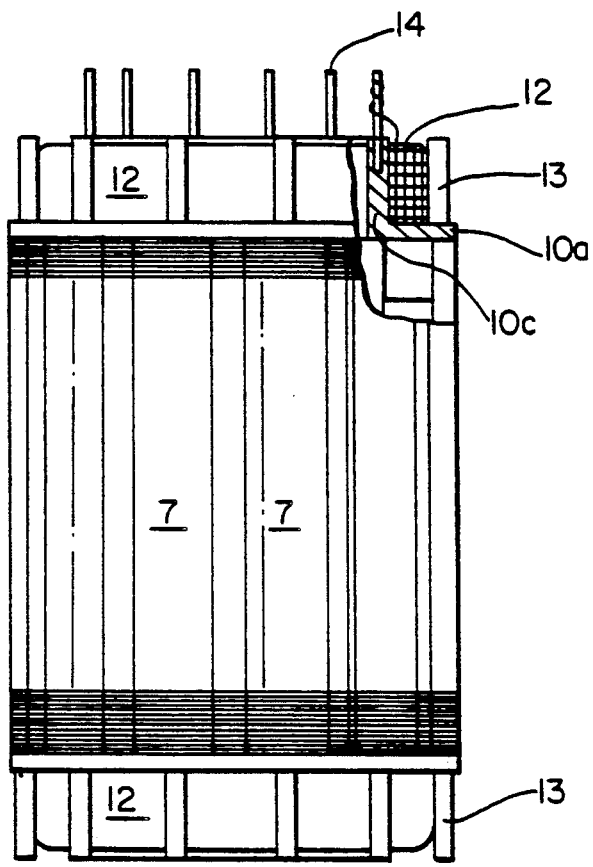
FIG. 5 is a view of the pole spider provided with the two end coverings and the winding.
Figure 6:
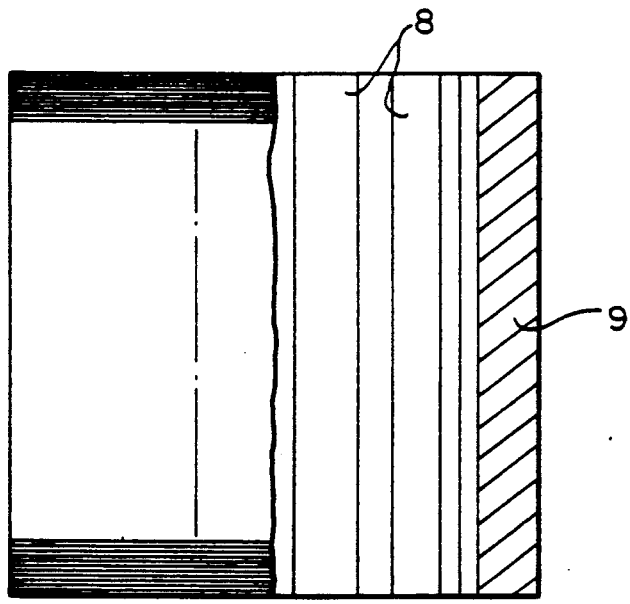
FIG. 6 is an axial section through half of the return element.

FIG. 5 shows, for example, a winding end attached to a holder 14. FIG. 6 shows on the right-hand half the swallowtail-shaped grooves formed by undercuts 8, which the outer ends of outer pole shoes engage.

We claim:

1. A method of manufacturing and winding a stator core stack of an electric motor comprising:

cutting from sheet metal strip a set of spaced, radially extending pole elements, an inner ring and a flux return element, wherein said cutting cuts said inner ring from said pole elements and said pole elements from said flux return element and provides interengagement means integral with and extending from said inner ring into the spaces between adjacent pole elements engaging said pole elements and permitting relative movement between said inner ring and said pole elements by punching and preventing relative rotational movement between said inner ring and said pole elements, separating said set of pole elements and the engaged inner ring from said sheet metal strip, and then stacking a plurality of the sets of said pole elements and said inner rings with said inner rings holding said pole elements by said interengagement means, applying windings to the stacked sets in the spaces between the pole elements while said stacked pole elements are being held by said stacked inner rings and said interengagement means thereof, stacking said flux return elements and after applying said windings, placing the stack of flux return elements on the stacked pole elements, windings and inner rings, and thereafter removing by punching said inner rings from said stacked pole elements, said windings and said flux return elements.

2. The method of claim 1, wherein said cutting of said inner ring provides an inner surface having a shape for receiving the mandrel of a winding machine.

3. The method of claim 1, and further comprising:

punching openings in said sheet metal strip at the inner end of said pole shoe elements, said openings extending within the outer periphery of said inner ring.

4. The method of claim 1, wherein said cutting of said interengagement means provides interengagement means in the form of a swallowtail.

* * * * *